United States Patent [19]
Smith

[11] Patent Number: 4,666,524
[45] Date of Patent: May 19, 1987

[54] ALUMINUM COMPLEX COATING COMPOSITIONS

[75] Inventor: Arthur C. Smith, Pensacola, Fla.

[73] Assignee: Reichhold Chemicals, Inc., White Plains, N.Y.

[21] Appl. No.: 783,191

[22] Filed: Oct. 2, 1985

[51] Int. Cl.$^4$ ............................ C09D 3/26; C09F 9/00
[52] U.S. Cl. ..................................... 106/264; 106/310; 525/7; 525/7.1
[58] Field of Search ................ 106/264, 310; 525/7.1; 525/7

[56] References Cited

U.S. PATENT DOCUMENTS

| | | | |
|---|---|---|---|
| 2,526,605 | 10/1950 | Fraser | 525/7 |
| 2,705,702 | 4/1955 | Berge | 525/7 |
| 3,230,188 | 1/1966 | Peters | 525/7.1 |
| 3,401,130 | 9/1968 | Korf | 525/7 |
| 3,715,328 | 2/1973 | Stapfer et al. | 525/7.1 |
| 3,925,279 | 12/1975 | Horii et al. | 525/7 |
| 4,075,178 | 2/1978 | Turner | 106/18.14 |
| 4,090,886 | 5/1978 | Turner | 106/310 |
| 4,180,645 | 12/1979 | Emmons et al. | 525/7 |
| 4,264,370 | 4/1981 | Turner | 106/264 |
| 5,036,769 | 7/1977 | Sugiyama et al. | 106/264 |

OTHER PUBLICATIONS

Love, D. J., "Aluminum Organic Compounds in High Solids Alkyd Coatings", Journal of Coating Tech., vol. 53, No. 680, pp. 55-58, 1981.
Vincent, J. E., "Chemistry of Aluminum-Organics in the Preparation of Ink Vehicles & Gel Varnishes", Armerican Ink Maker, pp. 25-35 (Oct. 84).
Aluminum Additives for the Printing Ink Industry—Chattem Chemicals, B/B 81-6.

Primary Examiner—Theodore Morris
Attorney, Agent, or Firm—Rodman & Rodman

[57] ABSTRACT

Compositions which contain one or more aluminum complexes, which find use in coatings, films, paints, lacquers and varnishes, are formed by reacting the aluminum complex with a nonfunctional resin. The nonfunctional resins have neither carboxyl nor hydroxyl functionality, yet react rapidly to form films in conjunction with the aluminum complexes.

17 Claims, No Drawings

ALUMINUM COMPLEX COATING COMPOSITIONS

BACKGROUND OF THE INVENTION

1. Field of the Invention

The present invention relates to compositions containing organic aluminum complexes having utility as coatings.

2. Description of the Prior Art

The use of organic aluminum compounds in coating compositions has gained wide acceptance, particularly in the formation of the films, paints, lacquers, varnishes, and the like.

U.S. Pat. No. 3,230,188 to Peters discloses an air drying coating composition which includes a metallic drying agent which can be an inorganic or organic aluminum compound. Several other suitable metals can also be used.

U.S. Pat. No. 4,180,645 to Emmons et al discloses an autooxidizable coating composition which utilizes a polyvalent metal containing a complex or salt which catalyzes the curing of an acrylate monomer and at least one member of the group consisting of an organic isocyanate, urethane oil, and a uralkyd.

The use of aluminum ethyl acetoacetato di-2-ethoxyethoxide in 2-ethoxy ethanol, in an alkyd coating composition is disclosed by D. J. Love in "Aluminum Organic Compounds in High Solids Alkyd Coatings", Journal of Coatings Technology, Vol. 53, No. 680, pages 55–58 (September 1981). Therein, Love discloses that when the aluminum compound is added to an alkyd solution, the alkoxide groupings undergo displacement through reaction with hydroxyl and carboxyl groups.

A description of the chemical reactions occurring between various aluminum organic compounds in inks and varnishes is disclosed by Dr. John E. Vincent in "Chemistry of Aluminum-Organics in the Preparation of Ink Vehicles and Gel Varnishes", American Ink Maker, pages 25–35 (October 1984).

Other aspects of coating technology are disclosed in U.S. Pat. No. 3,715,328 to Stapfer et al, which deals with cobalt (II) hydrazine complexes which can be used for drying alkyd coating compositions. U.S. Pat. No. 3,925,279 to Horii discloses various cold setting coating compositions which comprise maleinized liquid polybutadiene, a drying oil or semi-drying oil modified alkyd resin, a polyfunctional vinyl monomer, a ketone peroxide and a heavy metal salt of a carboxylic acid.

U.S. Pat. No. 2,705,702 to LaBerge discloses a coating composition containing a coconut oil modified methacrylate alkyd resin. U.S. Pat. No. 2,526,605 to Fraser discloses various gasket materials which utilize metallic dryers such as the naphthenates, resinates and oleates of cobalt, manganese, lead, zinc, or mixtures thereof.

SUMMARY OF THE INVENTION

The present invention relates to compositions containing one or more aluminum complexes, which find use in coatings, films, paints, lacquers and varnishes, wherein the composition also contains a nonfunctional resin. The nonfunctional resins have neither carboxyl nor hydroxyl functionality, yet react rapidly with the aluminum complexes to form coatings and films.

DESCRIPTION OF THE PREFERRED EMBODIMENTS

In accordance with the present invention, an air drying liquid coating composition containing an aluminum complex is prepared by reacting a nonfunctional low to medium molecular weight polymer with an aluminum complex in the presence of a metallic drying agent, to form the air drying liquid coating composition.

The formation of the low to medium molecular weight nonfunctional polymer entails the modification of a naturally occurring oil, such as linseed oil, tung oil, soya bean oil, dehydrated castor oil, fish oil, corn oil, perilla oil, safflower oil, oticia oil, cottonseed oil, Chinawood oil, as well as other naturally occurring unsaturated triglyceride oils, and combinations thereof with a sufficient amount of a vinyl monomer such as styrene, vinyl toluene, vinyl acetate, acrylonitrile, acrylamide, methacrylamide, $C_1$–$C_{18}$ alkyl esters of acrylic or methacrylic acid, such as methyl methacrylate, methyl acrylate, ethyl acrylate, ethyl methacrylate, butyl acrylate or methacrylate, 2-ethyl hexyl acrylate, and the like, through free radical polymerization to form the nonfunctional low to medium molecular weight polymer. Specifically, the average molecular weight varies from about 1000 to 3500, preferably 1800 to 3000.

In general, the amount of vinyl monomer can vary from about 20–75%, preferably 30–65% by weight of the total polymer. The free radical polymerization is generally achieved by using organic peroxides, such as benzoyl peroxide, lauryl peroxide, tertiary butyl perbenzoate, alpha,alpha'-azo-diisobutyronitrile, alpha,alpha'-azo-bisalpha,gamma dimethylvaleronitrile and benzoin. When desired, polymerization can also be accomplished by the use of heat, light, or ozone in the absence of all or part of the peroxide catalyst. Other suitable peroxide systems are disclosed in U.S. Pat. No. 3,715,328 to Stapfer et al at column 7, lines 43–65, the disclosure of which is incorporated by reference herein. The amount of peroxide can vary from about 0.05 to 5 weight %, based upon the weight of the nonfunctional polymer.

The nonfunctional polymer can then be reduced to suitable viscosity in an organic solvent such as toluene, xylene, naphtha, mineral spirits, and conventional ester or ketone solvents known in the art. The amount of solvent can vary from about 100 to 500 grams per liter of polymer solution. The viscosity on the Gardner Holdt range can vary from about Y to Z6, which corresponds to about 17.6 to 148 poises.

The low to medium molecular weight nonfunctional polymer solution is then contacted with a sufficient amount of an aluminum chelate complex such as aluminum ethyl aceto acetato di-2-ethoxy ethoxide, aluminum secbutoxide, or aluminum isoproproxide, chelated for example with a 1,3 dicarbonyl compound such as ethyl aceto acetate. The aluminum complexes are generally added in amounts varying from 0.1 to about 5% by weight of the total coating composition.

The polymer solution containing the aluminum chelate is also contacted with a cobalt or manganese drying agent, such as cobalt 2-ethyl hexoate, cobalt naphthenate, cobalt neodecanoate, or cobalt resinate, as well as other conventional drying agents, such as those disclosed in U.S. Pat. No. 3,230,188 to Peters at column 3, line 45 to column 4, line 2, the disclosure of which is incorporated by reference herein.

In general, the amount of metallic drying compound is not critical and varies widely with the kind of metal, the character of air drying coating composition used, the air drying speed desired, and the air temperature.

It has been found that the air drying liquid coating composition of the present invention comprising the nonfunctional low to medium molecular weight polymer solution, aluminum chelate, and metallic drying agent is stable until the film is cast, or coating applied, as the case may be, and the oxygen uptake activates the reaction.

It is believed that the metallic drying agents act upon methylenic hydrogens to produce hydroperoxides which then form reactive sites for complexation of the aluminum complexes.

What is claimed is:

1. A method for preparing an air drying liquid coating composition consisting essentially of: reacting a nonfunctional polymer having an average molecular weight of about 1000 to 3500, with an aluminum chelate complex and a metallic drying agent to form said liquid coating composition.

2. The method of claim 1, wherein said nonfunctional polymer is formed by modifying a naturally occurring unsaturated triglyceride oil with a vinyl monomer by means of a free radical polymerization reaction.

3. The method of claim 2, wherein the naturally occurring oil is selected from the group consisting of linseed oil, tung oil, oticia oil, safflower oil, cottonseed oil, China wood, soya oil, dehydrated castor oil, fish oil, corn oil, perilla oil, and combinations thereof.

4. The method of claim 2, wherein the vinyl monomer is selected from the group consisting of styrene, vinyl toluene, vinyl acetate, acrylonitrile, methacrylamide, and $C_1$-$C_{18}$ alkyl esters of acrylic or methacrylic acid.

5. The method of claim 2, wherein said low to medium molecular weight nonfunctional polymer is contacted with a nonaqueous organic solvent to form a polymer solution.

6. The method of claim 5, wherein the organic solvent is selected from the group consisting of toluene, xylene, naphtha, mineral spirits, esters, ketones and combinations thereof.

7. The method of claim 2, wherein said aluminum chelate complex is selected from the group consisting of aluminum ethyl aceto acetato di-2-ethoxy ethoxide, chelated aluminum sec-butoxide chelated aluminum isopropoxide, and mixtures thereof.

8. The method of claim 2, wherein the metallic drying agent is selected from the group consisting of cobalt and manganese based drying agents.

9. A method for preparing an air drying liquid coating composition consisting essentially of:
   (a) modifying a sufficient amount of a naturally occurring oil selected from the group consisting of linseed oil, tung oil, oiticica oil, soya oil, dehydrated castor oil, safflower oil, cottonseed oil, fish oil, corn oil, perilla oil, China wood and combinations thereof, with a sufficient amount of a vinyl monomer selected from the group consisting of styrene, vinyl toluene, vinyl acetate, acrylonitrile, methacrylamide, and $C_1$-$C_{18}$ alkyl esters of acrylic or methacrylic acid by means of a free radical polymerization reaction to form a nonfunctional polymer having an average molecular weight of about 1000 to 3500;
   (b) contacting said polymer with a nonaqueous organic solvent in amounts sufficient to produce a suitable viscosity for coating applications, said solvent selected from the group consisting of toluene, xylene, naphtha, mineral spirits, esters, ketones and combinations thereof, to form a polymer solution; and
   (c) contacting said polymer solution with an aluminum chelate complex and a metallic drying agent to form said air drying liquid coating composition, wherein said metallic drying agent is selected from the group consisting of cobalt and manganese based drying agents, to thereby form said coating composition.

10. The method of claim 9 wherein the aluminum chelate complex is selected from the group consisting of aluminum ethyl aceto acetato di-2 ethoxy ethoxide, chelated aluminum sec-butoxide, chelated aluminum isopropoxide and mixtures thereof.

11. A film forming coating composition consisting essentially of the reaction product of:
   (a) a nonfunctional polymer having an average molecular weight of about 1000 to 3500;
   (b) an aluminum chelate complex; and
   (c) a metallic drying agent.

12. The composition of claim 11, wherein the aluminum chelate complex is selected from the group consisting of aluminum ethyl aceto acetato di-2 ethoxy ethoxide, chelated aluminum isopropoxide, and mixtures thereof.

13. The composition of claim 11, wherein the nonfunctional polymer is formed by modifying a naturally occurring unsaturated triglyceride oil with a vinyl monomer by means of a free radical polymerization reaction.

14. The composition of claim 11, wherein the vinyl monomer is selected from the group consisting of styrene, vinyl toluene, vinyl acetate, acrylonitrile, methacrylamide, and $C_1$-$C_{18}$ alkyl esters of acrylic or methacrylic acid.

15. The composition of claim 11, wherein the aluminum chelate complex varies from about 0.1 to 5% by weight of the total coating composition.

16. The composition of claim 13, wherein the viscosity of the nonfunctional polymer on the Gardner Holdt range varies from about Y to Z6.

17. The composition of claim 11, wherein the metallic drying agent is selected from the group consisting of cobalt and manganese based drying agents.

* * * * *